April 24, 1934.　　　　R. J. VEDOVELL　　　　1,956,366
SEAL
Filed April 18, 1932　　　2 Sheets-Sheet 1
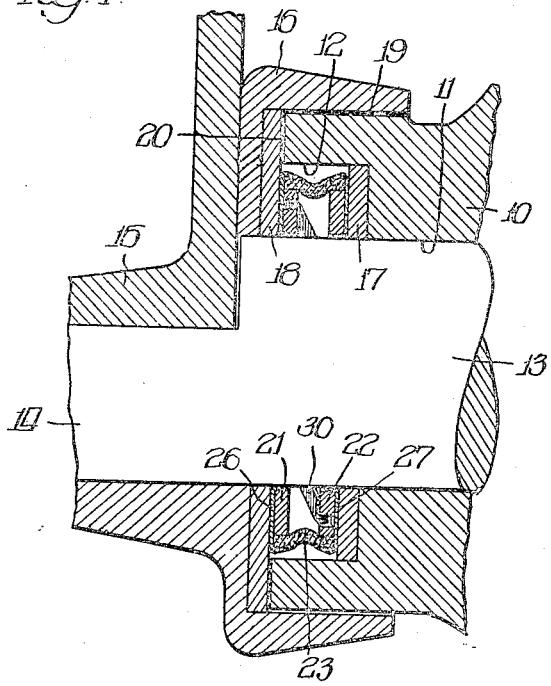
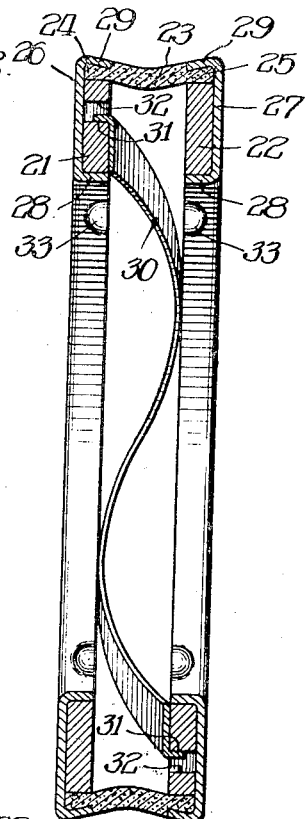
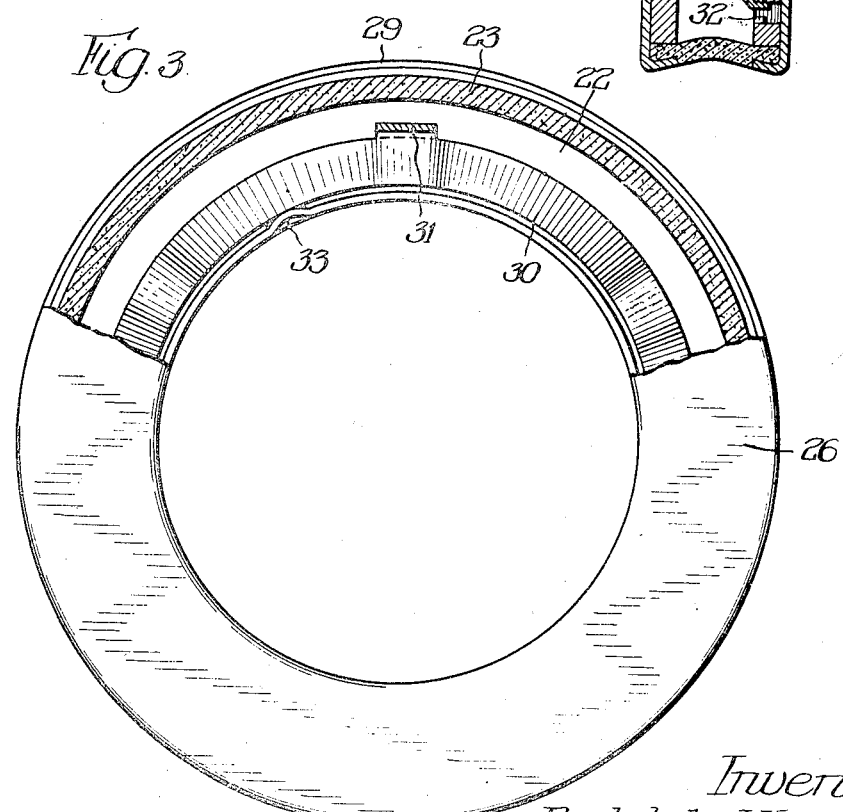
Inventor:
Rudolph J. Vedovell,
By Cromwell, Greist & Warden April 24, 1934.  R. J. VEDOVELL  1,956,366
SEAL
Filed April 18, 1932  2 Sheets-Sheet 2
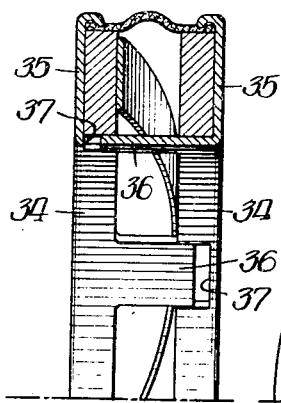
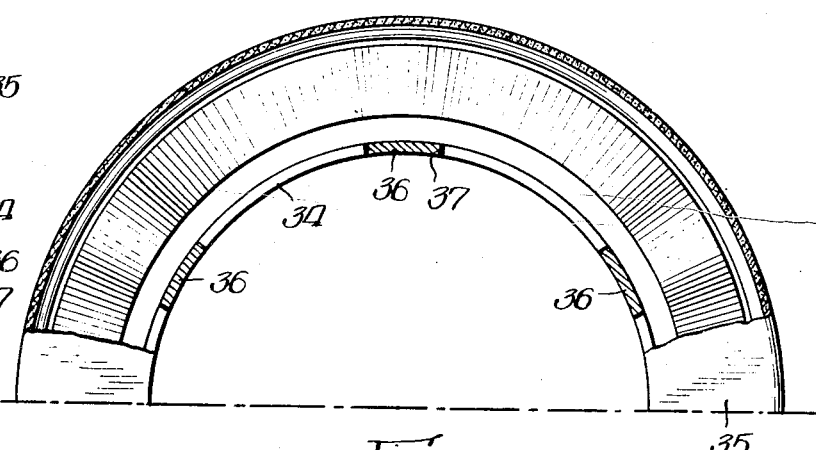
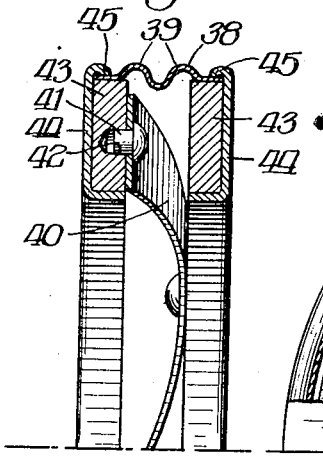
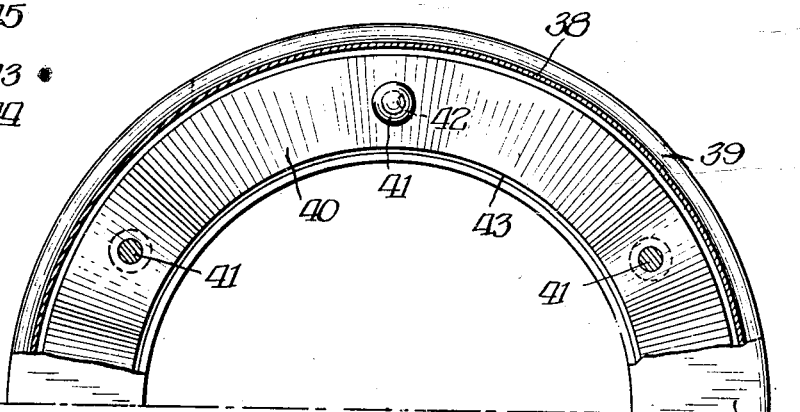
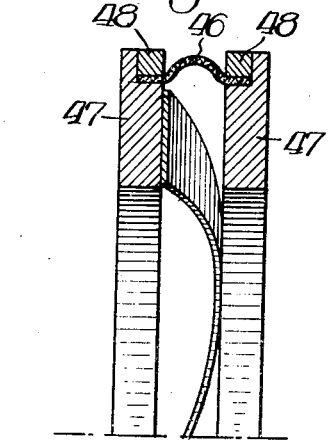
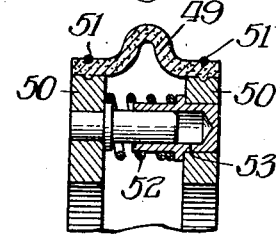
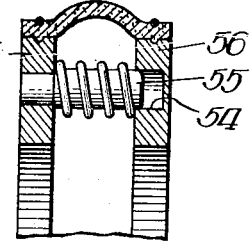
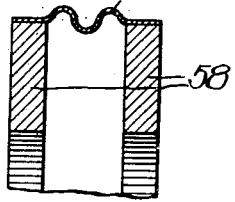
Inventor:
Rudolph J. Vedovell,
By Cromwell, Greist & Warden
attys.

Patented Apr. 24, 1934

1,956,366

UNITED STATES PATENT OFFICE 1,956,366

SEAL

Rudolph J. Vedovell, Chicago, Ill., assignor to Chicago Rawhide Manufacturing Company, Chicago, Ill., a corporation of Illinois Application April 18, 1932, Serial No. 605,841

7 Claims. (Cl. 286—11)

This invention has to do with seals of the type designed for insertion between opposed end faces of relatively rotatable members.

The principal object of the invention is to provide an improved seal of the type described which will prevent dust or other foreign matter from working in past the end faces, will prevent oil or other fluid from working out, will automatically compensate for any movement of the end faces toward or away from each other, will not interfere with free rotation of the members, is inexpensive to manufacture and is easy to install.

Other more specific objects and advantages will be apparent to those skilled in the art upon a full understanding of the construction, arrangement and operation of the improved seal.

Several different forms of the invention are presented herein for the purpose of exemplification, but it will of course be appreciated that the invention is susceptible of embodiment in still other structurally modified forms coming equally within the scope of the appended claims.

In the accompanying drawings:

Fig. 1 is a fragmentary diametric section through a wheel hub assembly equipped with the seal of the invention;

Fig. 2 is a diametric section through the seal shown in Fig. 1;

Fig. 3 is an end view of the same seal, with portions broken away to show the interior;

Figs. 4 and 5 are, respectively, a radial section and a partially sectioned fragmentary face view of a seal which embodies the invention in another form;

Figs. 6 and 7 are views which correspond to Figs. 4 and 5 but which show another embodiment of the invention; and Figs. 8, 9, 10 and 11 are radial sections through four other embodiments of the invention.

The seal which is shown in Figs. 1 to 3 inclusive will first be described. The seal is an annular member of generally U-shaped radial section, which is compressible within certain limits in an axial direction, the connecting part of the U-formation being yieldable, after the fashion of an accordion, and the spaced parallel sides of such formation being rigid but movable toward and away from each other. In Fig. 1 the seal is illustrated as installed in a track roller hub assembly, but it will of course be appreciated that it may be used advantageously in a great many other different places.

In Fig 1, the numeral 10 designates one end of the hub of a track roller, which end contains a bore 11 and a counterbore 12. The hub is journaled on a shaft 13, and the end 14 of the shaft which is adjacent the end 10 of the hub is fixedly mounted in a side bracket 15. The bracket 15 carries a cup-shaped member 16 which telescopes loosely over the end 10 of the hub. The seal—which forms the subject matter of this invention—is positioned in the counterbore 12 about the shaft 13 between a flat facing ring 17 which is placed against the end face of the hub and another flat facing ring 18 which is placed against the end face of the member 16. The seal bears snugly at all times against the opposed faces of the rings 17 and 18 but is free to turn with respect to either without disturbing the sealed joints produced with the rings.

A similar seal installation would be ordinarily made at the other end of the hub, the hub being permitted enough axial play between the side brackets to allow it to turn freely on the shaft without binding. The purpose of the seal is to retain the lubricant within the journal and to prevent any dust, grit or other foreign particles which may enter through the clearance openings 19 and 20 from working into the journal.

As will be observed in Figs. 1, 2 and 3, the particular seal therein shown consists of two spaced parallel coaxially arranged sheet metal washers 21 and 22. The washers are connected together by a thin, tough, flexible leather band 23 which encompasses both washers with the side edges 24 and 25 of the band stretched tightly about the outer edges of the washers. The band 23 is held in place by two thin sheet metal sheathing rings 26 and 27 which fit against the exposed end faces of the washers 21 and 22 and are provided at their inner and outer edges with axially turned rims 28 and 29. The inner rims 28 fit tightly against the inner edges of the washers, while the outer rims 29 clamp the side edges 24 and 25 of the leather band tightly against the outer edges of the washers. The outer rims 29 are preferably turned in a little in order to firmly grip the sides of the leather band and prevent disengagement of the same.

The washers 21 and 22 are resiliently spread apart by an undulated spring ring 30 which bears at regularly spaced intervals against the opposing inner faces of the washers, first against one, and then against the other. The spring ring 30 is preferably provided, at one or more of its points of contact with each ring, with small tongues 31 which project axially into sockets 32 in the washers, whereby to provide a circumferential interlock with both of the same. The tongues 31, by preventing any appreciable rotation of the washers 21 and 22 relative to each other, relieve the flexible leather diaphragm 23 from what otherwise might be severe torsional stresses.

The outer faces of the sheathing rings 26 and 27 are made perfectly flat and smooth in order to obtain a true surfaced and freely rotatable engagement with the opposing faces of the end thrust rings 17 and 18 in the hub assembly. When the seal is inserted in the hub assembly, it is compressed somewhat between the rings 17 and 18, causing the intermediate portion of the leather band 23 to bow inwardly a little as shown in Fig. 1, with the result that the spring 30 exerts an expansive action on the seal at all times and serves to maintain the sheathing rings 26 and 27 in snugly sealed engagement with the rings 17 and 18 irrespective of any slight axial movement of the hub on its shaft. The leather diaphragm 23, being imperforate, effectively seals off the space between the ends of the sealing unit. If desired, the inner rims 28 on the sheathing rings 26 and 27 may be indented at 33 into shallow notches in the washers 21 and 22 in order to securely lock the rings on the washers.

In the modification shown in Figs. 4 and 5, the tongues on the expansion spring are omitted and the inner rims 34 on the sheathing rings 35 are provided with alternating tongues 36 and slots 37. The tongues 36 on each ring project axially into the slots 37 in the other, providing a circumferential interlock which prevents the resiliently spaced parts of the seal from rotating relative to each other.

In the modification shown in Figs. 6 and 7, the flexible leather band is replaced by a thin spring metal band 38 which is provided in the intermediate portion thereof with a plurality of circumferentially extending ribs 39 of curved cross section. The ribs 39 constitute resiliently yieldable means for resisting compression of the seal. This seal is also provided with an undulated expansion spring ring 40, but the latter may be omitted if desired, depending upon the amount of resistance to compression needed. The ring 40 may also be provided with studs 41 for interlocking engagement with sockets 42 in the washers 43. The thin sheet metal sheathing rings 44 which encase the washers 43 are provided with inturned outer rims 45 which grip the side edges of the spring band 38.

In the form shown in Fig. 8, the sheathing rings are omitted and the side edges of the leather band 46 are attached to the washers 47 by metal retaining rings 48 of small rectangular cross section which fit tightly about the side edges of the leather band in annular grooves formed in the outer edges of the washers.

In the form shown in Fig. 9, the leather band 49 is secured to the washers 50 by means of fine wires 51 which are drawn tightly about the side edges of the band. In this particular form, the washers 50 are resiliently spread apart by means of a plurality of small coil springs 52 which encircle telescoping stud-and-socket connections 53 between the washers.

In the modification shown in Fig. 10, the sockets 54 for the circumferentially interlocking studs 55 are formed in one of the washers 56.

The form of the invention which is shown in Fig. 11 is quite similar in some respects to that which is shown in Figs. 6 and 7, but the expansion spring and the sheathing rings are omitted and the circumferentially ribbed spring metal band 57 is utilized not only to seal off the space between the outer edges of the washers 58 but also to spread the washers resiliently apart and to hold them against relative rotation. In this form, the side edges of the band 57 are secured to the outer edges of the washers by soldering, brazing or welding.

I claim:

1. In a seal of the type described, a pair of end rings, an axially collapsible imperforate sleeve extending from one ring to the other, and an undulated spring positioned between the rings in engagement with first one ring and then the other at circumferentially spaced intervals for maintaining the rings in spread apart relation, said spring being provided at one or more of its points of contact with the rings with tongues for circumferentially interlocking engagement with the rings in recesses provided in the latter.

2. In a seal of the type described, a pair of end rings, an axially collapsible imperforate sleeve extending from one ring to the other, and an undulated spring positioned between the rings in engagement with first one ring and then the other at circumferentially spaced intervals for maintaining the rings in spread apart relation, said spring being provided at one or more of its points of contact with the rings with means in interlocked engagement with the rings for preventing relative circumferential movement.

3. In a seal of the type described, a pair of axially spaced washers, an axially contractible sleeve connecting corresponding edges of the washers, and a pair of thin sheet metal sheathing rings positioned against the washers with corresponding edges of the rings flanged over the ends of the sleeve in clamped engagement with the latter.

4. In a seal of the type described, a pair of axially spaced washers, an axially contractible sleeve connecting the outer edges of the washers, and a pair of thin sheet metal sheathing rings positioned against the washers with the outer edges of the rings flanged over the ends of the sleeves in clamped engagement with the latter.

5. In a seal of the type described, a pair of axially spaced washers, an axially contractible leather sleeve connecting the outer edges of the washers, means tending to maintain the rings in spread apart relation, means for preventing relative rotation of the washers, and a pair of thin sheet metal sheathing rings positioned against the washers with the outer edges of the rings flanged over the ends of the sleeve in clamped engagement with the latter and with the inner edges of the rings flanged into engagement with the inner edges of the washers in circumferentially locked engagement with the latter.

6. In a seal of the type described, a pair of axially spaced washers, an axially contractible sleeve telescoped at its ends over the outer edges of the washers, and a pair of rings encircling the ends of the sleeve in clamped engagement with the latter.

7. In a seal of the type described, a pair of axially spaced washers, an axially contractible sleeve connecting corresponding edges of the washers, and a pair of thin sheet metal sheathing rings positioned against the washers with corresponding edges of the rings flanged over the ends of the sleeve in clamped engagement with the latter, said sheathing rings being provided with interfitting axially extending tongues and recesses.

RUDOLPH J. VEDOVELL.